(12) United States Patent
Temkin et al.

(10) Patent No.: US 7,280,722 B2
(45) Date of Patent: Oct. 9, 2007

(54) TEMPERATURE COMPENSATED OPTICAL MULTIPLEXER

(75) Inventors: Henryk Temkin, Ransom Canyon, TX (US); Luis E. Grave de Peralta, Lubbock, TX (US); Ayrton A. Bernussi, Lubbock, TX (US); Valeri Gorbounov, Oak Ridge, TN (US)

(73) Assignee: Texas Tech University, Lubbock, TX (US)

( * ) Notice: Subject to any disclaimer, the term of this patent is extended or adjusted under 35 U.S.C. 154(b) by 199 days.

(21) Appl. No.: 11/042,612

(22) Filed: Jan. 25, 2005

(65) Prior Publication Data

US 2005/0169579 A1     Aug. 4, 2005

Related U.S. Application Data

(60) Provisional application No. 60/540,941, filed on Jan. 30, 2004.

(51) Int. Cl.
G02B 6/12 (2006.01)
(52) U.S. Cl. .......................... 385/37; 385/14; 385/25; 385/31; 385/39; 385/46; 359/196; 359/197; 359/212; 359/220; 359/223; 359/224
(58) Field of Classification Search .................. 385/37, 385/14, 46, 24, 31, 39, 25; 359/196, 197, 359/224, 220
See application file for complete search history.

(56) References Cited

U.S. PATENT DOCUMENTS 6,493,487 B1 * 12/2002 Temkin et al. ................ 385/37
6,775,437 B2 * 8/2004 Kazarinov et al. ............ 385/37
2002/0097961 A1   7/2002 Kazarinov et al.

* cited by examiner

Primary Examiner—Frank G. Font
Assistant Examiner—Guy G Anderson
(74) Attorney, Agent, or Firm—Mark E. Scott; Conley Rose, P.C.

(57) ABSTRACT

An optical multiplexer that adjusts the wavelength response and compensates for temperature effects by using rotatable mirror. The wavelength response of the device is adjusted by aligning the mirror at a correct angle with respect to the surface terminating the optical waveguide grating. The temperature dependence of the index of refraction of the material comprising the waveguides is compensated for by rotating a reflecting surface of the mirror, the rotation based on differential thermal expansion. Some exemplary embodiments may comprise a slab waveguide on a substrate (the slab waveguide having a first and second arcuate end surfaces) attached to a submount, a mirror assembly rigidly attached to the submount (the mirror assembly comprising a first and second materials having different coefficients of thermal expansion), and an optical waveguide grating (upon the substrate attached to the submount) optically coupled between the second arcuate surface and the mirror assembly. A portion of the mirror assembly between the reflector surface and where the mirror assembly is rigidly attached to the submount deforms as a function of temperature to change an angle between the optical waveguide grating and the reflecting surface.

21 Claims, 3 Drawing Sheets

TEMPERATURE COMPENSATED OPTICAL MULTIPLEXER

CROSS-REFERENCE TO RELATED APPLICATIONS

This application claims the benefit of provisional application Ser. No. 60/540,941 filed Jan. 30, 2004 and titled, "Temperature compensated optical multiplexer," which application is incorporated by reference herein as if reproduced in full below.

STATEMENT REGARDING FEDERALLY SPONSORED RESEARCH OR DEVELOPMENT

Not applicable.

BACKGROUND OF THE INVENTION

1. Field of the Invention

Various embodiments of the invention are directed to temperature compensated optical multiplexers. More particularly, embodiments of the invention are directed to a reflective arrayed waveguide grating multiplexer having a mirror that rotates based on differential thermal expansion to compensate for differences in index of refraction caused by temperature changes.

2. Discussion of the Related Art

Optical multiplexers may comprise waveguides within which light of varying frequencies is allowed to propagate. However, the index of refraction within the waveguides changes with operating temperature, which therefore changes the optical path lengths and adversely affects operation. In order to obviate the adverse effects of temperature, some related art systems attempt to precisely control the temperature of optical multiplexers. Precise temperature control may be difficult and costly, particularly in remote locations.

Other related art devices may attempt to compensate for temperature changes rather than perform temperature control. Published United States Patent Application No. 2002/0097961A1 to Kazarinov discloses such a system. In the Kazarinov system, a rigid mirror is rotationally fixed to the substrate upon which the waveguides are formed. The mirror is rotated as a function of temperature by a thermally conductive body, e.g. a copper block, pushing on the reflective surface. However, it is difficult to rotationally mount the mirror on the substrate, and further the thermally conductive body pushing on the reflective surface and the substrate tends to distort the mirror and produce stress in the grating, degrading performance.

SUMMARY OF SOME OF THE PREFERRED EMBODIMENTS

The problems noted above are solved in large part by an optical multiplexer that compensates for temperature effects by rotating a reflector surface optically coupled to grating waveguides of the multiplexer. The rotation of the reflector surface is based on differential thermal expansion. Some exemplary embodiments may comprise a waveguide sections and a mirror assembly rigidly coupled to a common silicon submount. A portion of the mirror assembly between the reflector surface and where the mirror assembly is rigidly attached to the submount deforms as a function of temperature to change an angle between the optical waveguide grating and the reflector surface.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

Figure 1:
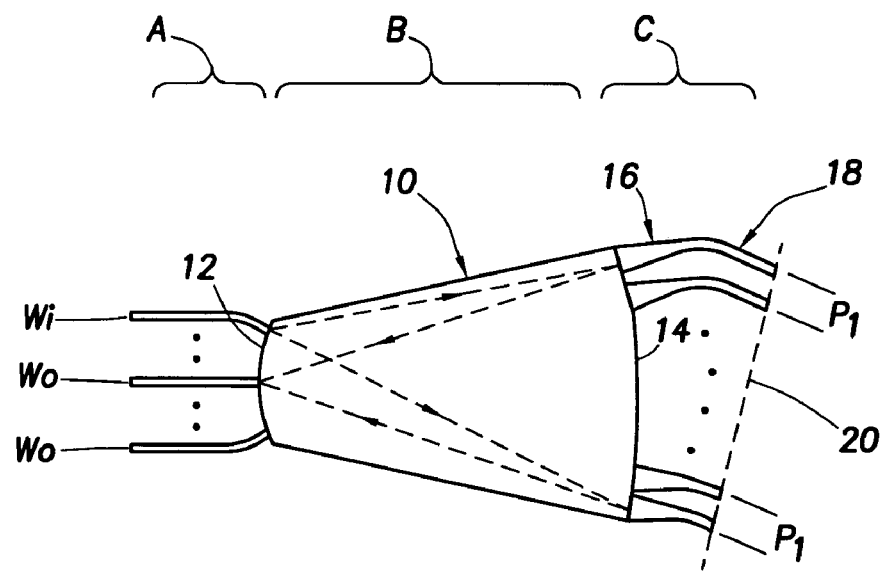
FIG. 1 illustrates a portion of an optical multiplexer in accordance with embodiments of the invention.
Figure 2:
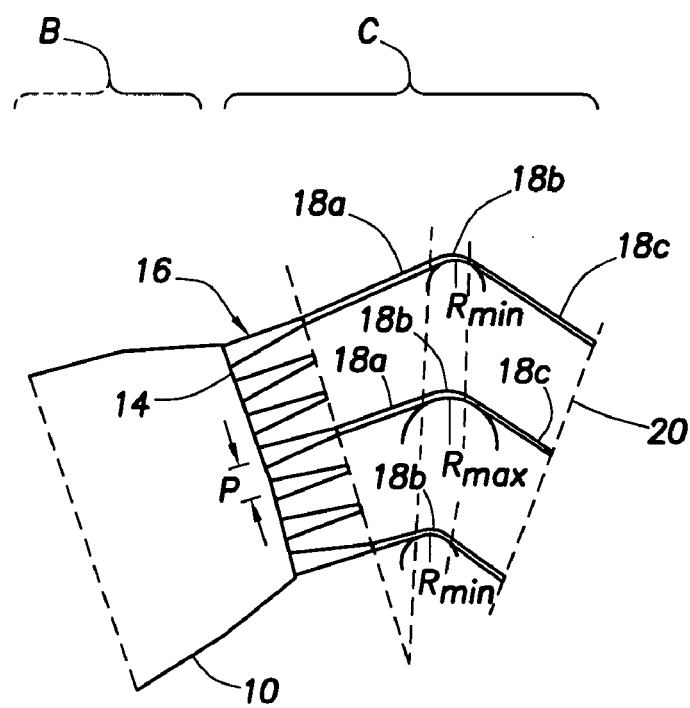
FIG. 2 illustrates a portion of the optical multiplexer of FIG. 1 in greater detail.

The optical waveguide device depicted in FIGS. 1 and 2 comprises three main parts, an input/output optical waveguide structure A; a slab waveguide region B; and a reflective optical waveguide grating C. The input/output waveguide structure A comprises an input optical waveguide Wi and a plurality of output optical waveguides Wo. The waveguides Wo are spaced apart on one side of the waveguide Wi. The waveguides Wi and Wo interface with and extend radially from an arcuate first end surface 12 of a slab waveguide 10 of region B. The waveguides Wi and Wo provide ports for communicating light waves to and from the slab waveguide 10.

The slab waveguide 10 has a second arcuate end surface 14, disposed opposite from the first end surface 12. The second arcuate surface 14 interfaces with a plurality of laterally spaced tapered optical waveguide sections 16 which extend radially from the second arcuate surface 14. The waveguide sections 16 taper from wider ends at the interface with the second surface 14 to narrower ends more remote from the second surface 14. At the interface between the wider ends of the tapered sections 16 and the slab end surface 14, light is confined within the tapered sections and throughout the lengths of the respective tapers.

The optical reflective waveguide grating structure C comprises the tapered waveguide sections 16, the narrower ends of which are continued as an array of laterally spaced apart waveguide sections 18. Each waveguide section 18 terminates, and the termination points of the waveguide sections 18 define a termination surface, as illustrated by dashed line 20 in FIGS. 1 and 2. The lateral spacing (labed P1 in FIG. 1) of adjacent waveguide sections at their termination points should be constant. As shown in FIG. 2, the waveguide sections 18 include straight portions 18a, having the same width as each other and different lengths, which are continuations of the narrower ends of the tapered waveguide sections 16. The waveguide sections 18 also comprise curved portions 18b which have different radii of curvature. Portions 18c of the waveguide sections 18 extend from and tangentially to the curved portions 18b, each terminating proximate to the reflector surface 20.

Consider the device illustrated in FIG. 1 operating as a demultiplexer. A plurality of optical signals, each having a different wavelength and which have been multiplexed together are communicated by an optical fiber to the input waveguide Wi, and are diffracted as they travel across the slab waveguide 10. After crossing the slab waveguide 10 the light impinges on the second arcuate end surface 14. The optical signals are then propagated along the respective optically isolated grating waveguide sections 18, reflected from a reflector surface 26 of a mirror assembly 22 (FIG. 3), and returned to the slab waveguide 10 along the waveguide sections 16 and 18. Because of the different lengths of the optical paths, wavefronts of the light are shifted causing constructive and destructive interference such that substantially only one wavelength of light impinges on each output optical waveguide Wo. Operating conversely, a plurality individual single wavelength optical signals could be fed to the waveguides Wo, and after propagation to and from the reflector surface 20, emerge at the waveguide Wi as a multiplexed set of optical signals.

Figure 4:
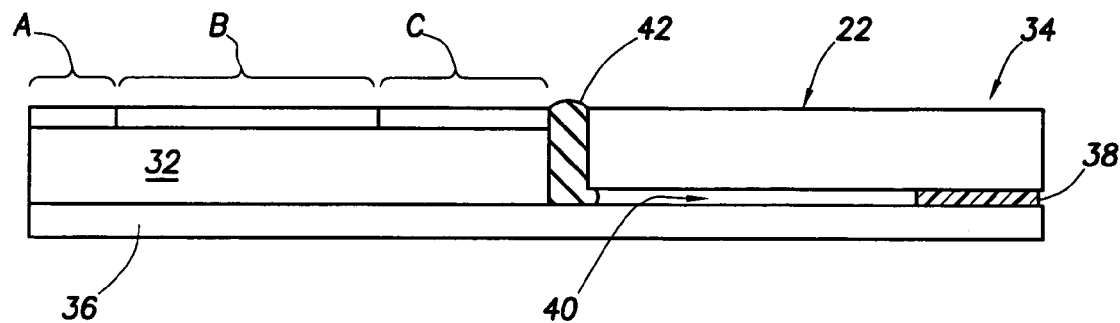
FIG. 4 illustrates an elevational side view of the optical multiplexer of FIG. 3.

The waveguide sections Wi, Wo, the slab waveguide 10, the tapered waveguide sections 16, and the grating waveguide sections 18 conveniently may be constructed as an integrated structure on a substrate 32 (FIG. 4). Each of the waveguides may comprise a propagation core of high refractive index material sandwiched between cladding layers of low refractive index material. In some embodiments, a silicon substrate may be used with the cladding and core layers defined by differently doped silica layers.

Light waves transmitted through the slab waveguide 10 are propagated in two dimensions with light signals confined in the core layer of the dielectric material, the vertical dimension (thickness) of which (perpendicular to the plane of FIG. 1) is such that single mode waveguide transmission of light waves is ensured. Using a silica-on-silicon slab waveguide structure, the thickness is on the order of about 5 microns. The difference in the index of refraction between the core (doped silica) and cladding (undoped or differently doped silica) materials may be greater than about 0.5%. In the lateral dimension (essentially bound by the periphery of the waveguide slab) there is no confinement. The interface between the input/output waveguide structure Wi, Wo and the slab waveguide end surface 12 (interface arc I), as well as the interface between the slab waveguide end surface 14 and the tapered waveguide sections 16, (interface arc II), should each form an arc of a circle. The two circles preferably have the same radius R. The center of the interface arc I is located on the interface arc II, and vice versa. U.S. Pat. No. 6,493,487 to Temkin, which is incorporated by reference herein as if reproduced in full below, discusses in greater detail the relationships and sizes of the various components.

Light waves entering the slab waveguide 10 through input optical waveguide Wi propagate across the slabe waveguide 10 and impinge on the grating region C. Since the grating waveguide sections 18 are unequal in length, the optical round trip path from the input waveguide Wi to the reflector surface 20 and back to each output waveguide Wo is different for each waveguide section 18, resulting in a phase shift along each round trip path. The phase shift between neighboring waveguide sections 18 depends on the light wavelength in the respective channels, the difference in the physical path lengths, and the index of refraction of the optical waveguide. The phase shift increment is constant across the grating region C and, for each light wave returning back to the interface arc I (surface 12), results in the rotation of the wavefront.

Figure 3:
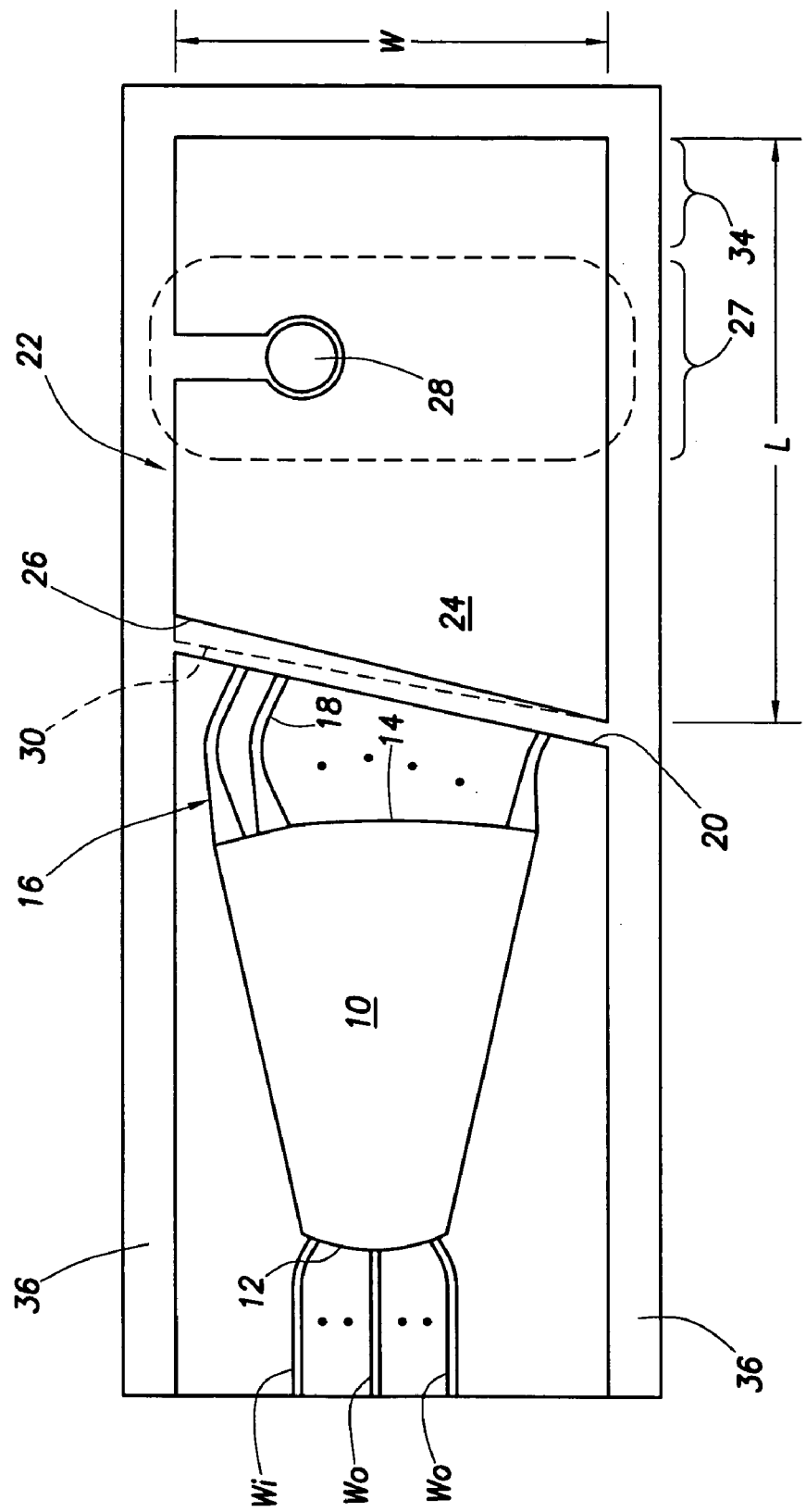
FIG. 3 illustrates an optical multiplexer comprising a mirror assembly that rotates as a function of temperature.

However, changes in temperature result in changes in the index of refraction, and therefore changes the optical path length (product of the round trip physical path length and the index of refraction). As illustrated in FIG. 3, a multiplexer in accordance with at least some embodiments of the invention comprises a mirror assembly 22 forming the reflector surface 26. In particular, the mirror assembly 22 comprises a first material 24, which may be polished on one end to create the reflector surface 26. The mirror assembly 22 may also comprise a second material 28. In accordance with embodiments of the invention, the first material 24 and the second material 28 may have different coefficients of thermal expansion, such that as the overall temperature changes, differential thermal expansion between the first material 24 and the second material 28 creates a deformation zone 27. Deformation within the deformation zone 27 results in a rotation of the reflector surface 26, as illustrated by dashed line 30. Thus, the path length associated with each one of the waveguides 18 changes as a function of the temperature. As the temperature of the device changes, the wavefront is adjusted by the differing path lengths (caused by rotation of the mirror) to keep each channel substantially focused on its output waveguide Wo.

The distance between the surface 20 where the waveguides 18 terminate and the reflecting surface 26 is exaggerated in FIG. 3 to illustrate rotation of the reflecting surface 26. In operation, the reflecting surface may be approximately 10 micrometers (microns) from the termination surface 20 of the waveguides 18.

FIG. 4 shows an elevational side view of the temperature compensated multiplexer/demultiplexer in accordance with embodiments of the invention. In particular, FIG. 4 illustrates the input/output waveguide structure A, free space region B, and grating waveguide region C, possibly fabricated directly on substrate 32. The substrate, in turn, may be affixed to a submount 36. Likewise, the mirror assembly 22 may be rigidly coupled to the submount 36 on one end. In accordance with alternative embodiments, the substrate 36 may be extended in the direction of the grating waveguides, and the mirror assembly rigidly coupled to the substrate. In order for the reflector surface 26 to rotate, an attachment zone or fixed end 34 of the mirror assembly 22 may be rigidly coupled to the submount 36, such as by epoxy 38. Thus, while the fixed end 34 remains fixed, differential expansion caused by differences in the coefficient of thermal expansion of the materials of the mirror assembly 22 allows the reflector surface 26 to rotate (in a direction perpendicular to the page as illustrated in FIG. 4). FIG. 4 also illustrates that there may be a gap 40 between the composite mirror structure 22 and the submount 36, which may be on the order of a few microns. In accordance with at least some embodiments the gap between the termination surface 20 of the grating waveguides 18 and the mirror assembly 22 may be filled with an index matching material 42 that improves the optical coupling between the grating waveguide region C of the multiplexer and the mirror assembly 22. This index matching material 42 also suppresses undesirable optical reflections at the termination points of the grating waveguide region along termination surface 20. However, the presence of material 42, with its own coefficient of thermal expansion, may require adjustment in the rate of rotation of the mirror assembly 22.

Figure 5:
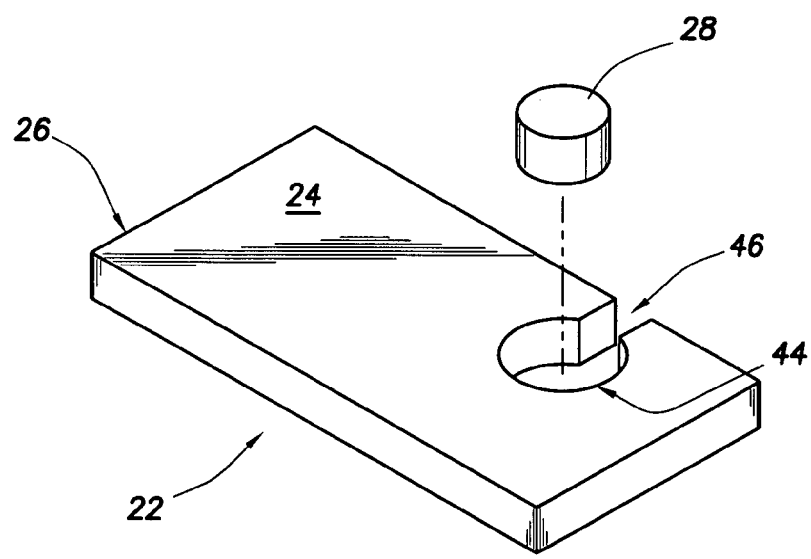
FIG. 5 illustrates a mirror assembly in accordance with embodiments of the invention.

FIG. 5 shows a perspective exploded view of the mirror assembly 22 in accordance with embodiments of the invention. In particular, the first material 24 may be fashioned into a plate as illustrated in FIG. 5. The reflector surface 26 may then be created by polishing the edge of the first material 24. In accordance with embodiments of the invention, the first material 24 may comprise a material that has a coefficient of thermal expansion approximately equal to that of silicon. Thus, the first material 24 may be silicon, or the first material 24 may be a metal alloy with a coefficient of thermal expansion similar to that of silicon such as an alloy of steel and nickel known as Invar. In accordance with embodiments of the invention, an aperture 44 is cut through the first material 24, and in some embodiments the aperture is circular. Additionally, a channel 46 may be cut into the first material 24. The second material 28, preferably in the form of a cylindrical plug, is placed within the aperture 44. The second material may be any suitable material having a coefficient of thermal expansion greater than that of the first material 24, for example, aluminum, copper, brass, steel or silver. Once the second material 28 in the form of a plug is placed within the aperture 44, differences in coefficients of thermal expansion result in deformation within the deformation zone 2 (FIG. 3), which in turn rotates the reflector surface 26, as illustrated by dashed line 30 in FIG. 3. This method of assembly eliminates the need for any adhesives, resulting in a highly reliable mirror.

Referring again to FIG. 3, for a mirror assembly 22 having a long dimension length L of approximately 27.7 millimeters (mm), a width W of approximately 15.4 mm, and a thickness of approximately 1.1 mm, the circular aperture 44 preferably has a diameter of approximately 3.2 mm. Prior to placement within the aperture, the second material 28 in the form of a cylindrical plug may have an outside diameter of approximately 3.3 mm at room temperature. Installation of the plug of second material 28 may take place by cooling the second material in liquid nitrogen, and placing the plug within the aperture 44 while the second material is at or near the temperature of liquid nitrogen. As the second material 28 warms, it is held in place friction coupling. The mirror assembly 22 constructed in accordance with embodiments of the invention preferably rotates with temperature at a rate of $1.8 \times 10^{-4}$ degrees/degree C. When placed in the assembly illustrated in FIG. 3 the multiplexer operates independently of the ambient temperature in the range of 0-85° C. The rate of rotation may be adjusted, for example to accommodate the presence of index matching material 42, by changing the diameter of the opening 44 or by changing the material 28.

In optical transmission systems all the channels coincide with the predetermined set of wavelengths defined by the International Telecommunication Union (ITU). This set of wavelengths is known as the ITU grid. The response channels of multiplexing devices should match the ITU grid to within ¼ of the channel passband width. For example, with multiplexers operating on a 100 GHz grid, each channel has a passband width of 0.2 nm (nanometer) and each channel should be within 0.05 nm of the nearest ITU wavelengths. Practical manufacturing tolerances encountered in the fabrication multiplexers make these tolerances very difficult to meet. This is because neither the index of refraction of the materials used nor the precision of forming the required waveguide structures can be controlled with the required precision. As discussed in the Background section, temperature tuning is used in the related art to shift the channel response to the required wavelengths. However, temperature tuning requires heating or cooling elements and provision of electrical power to the package.

The mirror assembly described addresses this problem. The transmission spectra of a device as illustrated in FIG. 3 shift with the angular position of the reflector surface. As the angle between the device and the reflector surface 26 is increased the spectra of all channels shift linearly to longer wavelengths. By varying the mirror angle by ~0.03°, a wavelength shift as high as 2.0 nm may be obtained. Since the intended channel-to-channel separation is approximately 0.8 nm, this shift is sufficient to move the response wavelength to the ITU grid. It should be also pointed out that this process does not alter the overall performance of the device. In the test devices that form the basis of this specification, a loss penalty of less than 0.15 dB (decibels) was observed for the angular tilt corresponding to the wavelength shift equal to the channel-to-channel separation (~0.8 nm).

Operation of the multiplexer illustrated in FIGS. 1 and 2 with the mirror illustrated in FIG. 3 satisfies two problems. The initial placement of the mirror assembly 22 at a correct angle with respect to the reflecting surface 20 assures wavelength response match with the ITU grid. Once the mirror assembly 22 is attached to the submount 36 the wavelength response is fixed. At this point any variation in the ambient temperature will be compensated for by rotation of the surface 26 of the external mirror.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An optical waveguide multiplexer comprising:
   a slab waveguide upon a substrate, the slab waveguide having a first and second arcuate end surfaces;
   a mirror assembly, the mirror assembly comprising a first and second materials having different coefficients of thermal expansion, and the first material having a reflector surface; and
   an optical waveguide grating upon the substrate and optically coupled between the second arcuate surface and the mirror assembly;
   wherein the mirror assembly deforms to change an angle between the optical waveguide grating and the reflector surface.

2. The optical waveguide multiplexer as defined in claim 1 further comprising a submount, and wherein the substrate rigidly couples to the submount, and also wherein the mirror assembly rigidly couples to the submount.

3. The optical waveguide multiplexer as defined in claim 1 wherein the mirror assembly further comprises a plate of the first material having the reflector surface in operational relationship to the optical waveguide grating, and wherein the plate deforms within a deformation zone to change the angle between the optical waveguide grating and the reflector surface.

4. The optical waveguide multiplexer as defined in claim 3 wherein the plate further comprises an aperture in the deformation zone, and wherein the second material is within the aperture.

5. The optical waveguide multiplexer as defined in claim 4 wherein the aperture is substantially circular, and wherein the second material is in the form of a circular cylinder within the aperture.

6. The optical waveguide multiplexer as defined in claim 1 wherein the first material is metal alloy with a coefficient of thermal expansion approximately the same as silicon.

7. The optical waveguide multiplexer as defined in claim 6 wherein the metal alloy is an alloy of at least one steel and nickel.

8. The optical waveguide multiplexer as defined in claim 1 wherein the first material is silicon.

9. The optical waveguide multiplexer as defined in claim 1 wherein the second material has a coefficient of thermal expansion greater than the first material.

10. The optical waveguide multiplexer as defined in claim 9 wherein the second material is at least one material selected from the group: aluminum, copper, brass, steel and silver.

11. The optical waveguide multiplexer as defined in claim 1 wherein optical waveguide grating further comprises a plurality of waveguide sections optically coupled to the second arcuate surface, each of the plurality of waveguide sections terminating proximate to the mirror assembly, and wherein the center-to-center spacing of the termination point of adjacent waveguide sections is constant for all the waveguide sections.

12. The optical waveguide multiplexer as defined in claim 1 further comprising an input optical waveguide and a plurality of output optical waveguides, each of the waveguides optically coupled to the first arcuate surface.

13. The optical waveguide multiplexer as defined in claim 12 wherein the output optical waveguides are spaced apart on one side of the input optical waveguide.

14. The optical waveguide multiplexer as defined in claim 1 further comprising an index matching material between the optical waveguide grating and the mirror assembly.

15. A method of making an optical waveguide multiplexer comprising:
    creating an optical waveguide input coupler on a substrate;
    creating a plurality of waveguide output couplers on the substrate;
    creating a free space propagation region on the substrate having a first arcuate surface optically coupled to the input and output waveguide couplers;
    creating a folded grating waveguide on the substrate optically coupled to a second arcuate surface of the free space propagation region;
    rigidly attaching the substrate to a submount; and
    rigidly attaching a deformable mirror to the submount at a fixed end, deformation of the mirror as a function of temperature rotating a reflector surface of the mirror.

16. The method as defined in claim 15 wherein rigidly attaching the deformable mirror further comprises rigidly attaching a first end of a plate of material, the first end substantially opposite a second end of the plate comprising the reflector surface.

17. The method as defined in claim 16 wherein rigidly attaching further comprises attaching the first end of the plate to the submount using an adhesive or solder.

18. A structure comprising:
    a plate of first material, one of the plate's larger surfaces defining a plane;
    a reflector surface on a first end of the plate, a plane defined by the reflector surface substantially perpendicular to the plane defined by the larger surface;
    an aperture through the plate and a channel from an edge of the plate to the aperture; and
    a plug of second material within the aperture, the second material having a coefficient of thermal expansion greater than that of the first material;
    wherein the difference in the coefficient of thermal expansion between the plug and the plate cause the plate to deform with temperature changes, and the deformation causes rotation of the reflector surface substantially within the plane defined by the larger surface.

19. The structure as defined in claim 18 wherein the first material comprises a material having a coefficient of thermal expansion approximately the same as silicon.

20. The structure as defined in claim 18 wherein the aperture is substantially circular.

21. A method comprising trimming the output response of an optical waveguide multiplexer by rotationally aligning a mirror assembly prior to affixation of the mirror to a submount.

* * * * *